No. 643,250. Patented Feb. 13, 1900.
A. C. LADD.
TOBACCO PIPE.
(Application filed July 21, 1898.)
(No Model.)

Witnesses.
W. R. Edelen.
Edgar S. Eckles.

Inventor
Allison C. Ladd.
By Story B. Ladd
Atty.

UNITED STATES PATENT OFFICE.

ALLSTON C. LADD, OF ALLEGHENY, PENNSYLVANIA.

TOBACCO-PIPE.

SPECIFICATION forming part of Letters Patent No. 643,250, dated February 13, 1900.

Application filed July 21, 1898. Serial No. 686,537. (No model.)

*To all whom it may concern:*

Be it known that I, ALLSTON C. LADD, a citizen of the United States, residing at Allegheny, in the county of Allegheny and State of Pennsylvania, have invented certain new and useful Improvements in Tobacco-Pipes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to tobacco-pipes, and particularly to an improved and novel means for connecting the pipe stem or stummel to the mouthpiece by an absorbent-carrying tube, whereby an annular chamber is formed around the tube between the ends of the latter which engage the stummel and mouthpiece.

Tobacco-pipes have been provided with absorbent-carrying tubes, which form the connection between the stummel and the mouthpiece; but in all of such pipes known to me the tubes have a continuous engagement with the stummel and the mouthpiece throughout the length of the tube and there is no chamber surrounding the tube. When the connection is once made in such pipes to effect tight joints, it is almost impossible to disconnect the parts, and after such pipes are used even for a short time it is impossible to separate the parts, owing to the expansion of the wood causing a contraction of the bore and the gumming of the tube by the moisture and nicotine from the pipe. This is true whether the tube be straight, tapering, or screw-threaded, and after experimenting with such pipes I find it impossible to remove the tube without breaking or damaging the pipe-stummel. It is to overcome these objections and difficulties and to provide a construction of stummel that shall have a tight non-leaking short joint between the stummel and connecting-tube, leaving a chamber surrounding the tube to permit the wood to swell without engaging the tube and to receive any possible escaping saliva and nicotine.

The invention consists of the novel construction and arrangement of parts, and results, essentially, in a pipe-stummel having a smooth bore terminating in a contracted neck forming the only contact between the stummel and a tube for connecting the mouthpiece and leaving a chamber between the stummel and tube.

Figure 1:
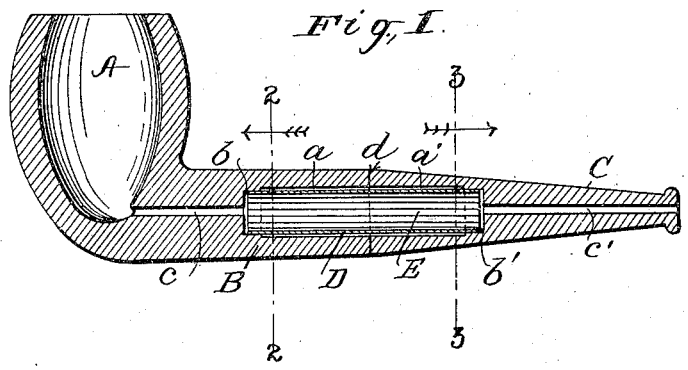
Figure 2:
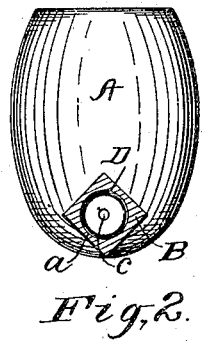
Figure 3:
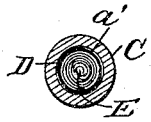

In the accompanying drawings, forming part of this application, Figure 1 is a longitudinal section of a pipe embodying my invention. Fig. 2 is a cross-section on the line 2 2 of Fig. 1. Fig. 3 is a cross-section of the tube containing absorbent material, taken on the line 3 3 of Fig. 1.

The same reference-letters denote the same parts in the three views of the drawings.

The bowl A of the pipe is of ordinary construction and has the usual passage $c$. The stem or stummel B has a smooth bore extending from the outer end and terminating in a contracted neck $b$. The mouthpiece C has the usual passage $c'$ and is provided with a similar bore, which terminates in a like neck $b'$. The tube D, having a filling of absorbent material E, is secured to the mouthpiece by frictional contact at one end with the neck $b'$, and the other end of the tube is forced into the neck $b$, which brings the mouthpiece flush with the stummel and leaves an annular chamber $a$ in the stummel and a like chamber $a'$ in the mouthpiece, so that the chambers communicate and afford a space between the stummel, mouthpiece, and tube for the expansion of the wood of the pipe and to receive any escaping moisture, nicotine, or saliva. The parts being thus separated except at the necks, they may be quickly and expeditiously taken apart for cleaning and renewal of the absorbent material without injury or defacement.

What I claim is—

1. In a tobacco-pipe, the combination, with the mouthpiece, and an absorbent-holding tube detachably connected at one end to the mouthpiece, of the stummel having a bore from the outer end and terminating in a contracted neck to hold the other end of the tube and leave a chamber between the stummel and the tube, as set forth.

2. In a tobacco-pipe, the combination with the stummel having a smooth bore from its outer end and terminating in a contracted neck, of the mouthpiece having a like bore and neck, and an absorbent-holding tube the ends of which are held by the said necks, so as to couple the stummel and mouthpiece and leave an annular chamber around the tube, as set forth.

In testimony whereof I affix my signature in presence of two witnesses.

ALLSTON C. LADD.

Witnesses:
STORY B. LADD,
S. A. TERRY.